Aug. 30, 1966

J. N. SWANSON 3,269,043

DISPLAY DEVICE

Filed April 22, 1964

INVENTOR.
JOHN NORMAN SWANSON

BY
*Lockwood, Woodard, Smith & Weikart*
*Attorneys*

Aug. 30, 1966 J. N. SWANSON 3,269,043
DISPLAY DEVICE
Filed April 22, 1964 3 Sheets-Sheet 3

INVENTOR.
JOHN NORMAN SWANSON
BY
Lockwood, Woodard, Smith & Weikart
Attorneys

United States Patent Office 3,269,043
Patented August 30, 1966

3,269,043
DISPLAY DEVICE
John Norman Swanson, Indianapolis, Ind., assignor of twenty-five percent to Donald L. Rutledge, Indianapolis, Ind., and ten percent to Richard L. Harbison, Indianapolis, Ind.
Filed Apr. 22, 1964, Ser. No. 361,727
5 Claims. (Cl. 40—102)

The present invention relates to a display device which finds particular utility as a means of visually presenting an insurance program.

An object of the present invention is to provide an improved visual aid for the sale of a product or service.

In the sales of highly technical items such as drugs, building materials or insurance, it is very desirable that the salesman or agent be able to present a smoothly integrated description of his product or service and be able to answer related questions without stumbling and with accuracy. Particularly in the sales of insurance, it is desirable that an agent be able to present a complete or substantially complete story on a policy or insurance program without being required to return to the office to calculate the prospects program and to prepare colored charts or the like. If an agent cannot explain the prospect's complete program with appropriate visual aids at a single sitting or call, there is a good chance that the prospect, now being in the insurance mood, will be sold on another agent's policy or another insurance company.

Consequently, a further object of the present invention is to provide a display device which makes possible a colored graphic demonstration of an insurance policy and its ramifications, effects, meanings, projected values, guaranteed values, etc. without difficult and involved calculations and figuring.

Many potentially good insurance agents are lost to the insurance business and their companies during their first year or two in the business because of the fact that they are not able to sell a policy or a program. Part of the reason for this failure is that the agent does not stick to the point or "gets off the track" confusing the prospect and the agent himself. Consequently, a further object of the present invention is to provide a display device providing a focal point or a sales presentation thus preventing an agent from getting off the point.

Still another object of the present invention is to provide a display device which can be arranged in a number of "attention getting" positions and configurations yet which can be folded up into a convenient carrying configuration like that of a briefcase.

A further object of the present invention is to provide a display device which is sturdy and capable of withstanding hard usage.

Another object of the invention is to provide a display device particularly useful in training insurance agents and in explaining the unfamiliar language of life insurance.

Related objects and advantages will become apparent as the description proceeds.

The full nature of the invention will be understood from the accompanying drawings and the following description and claims.

Figure 1:
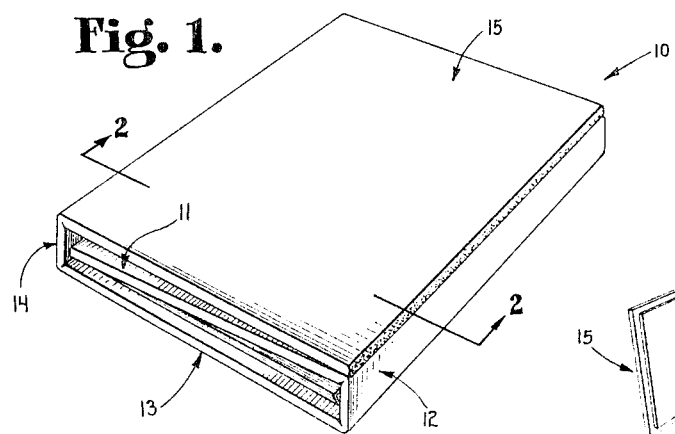
FIG. 1 is a perspective view of a display device embodying the present invention and showing the device in closed or folded position.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a display device 10 which includes five connecter panels 11–15. Each of the panels 11–15 includes a stiffener plate 16 with the various stiffener plates being covered by a cloth covering 20 which foldably connects the stiffener plates together width edge to width edge to provide a string of rectangular connected panels. In the case of the outstide panels 13 and 15 (of FIGS. 1 and 2), there is cotton padding 21 provided between the cover 20 and the stiffener plate.

When the various panels are folded in the position illustrated in FIG. 1, the overall effect is one simulating a brief case. Preferably the device is formed of quality materials so that the overall appearance is highly attractive and the device is capable of long wear.

Figure 2:
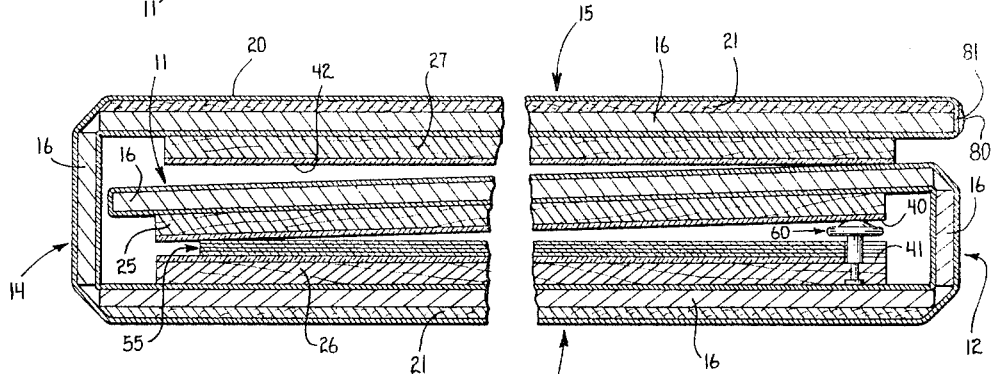
FIG. 2 is an enlarged section taken along the line 2—2 of FIG. 1 in the direction of the arrows.
Figure 6:
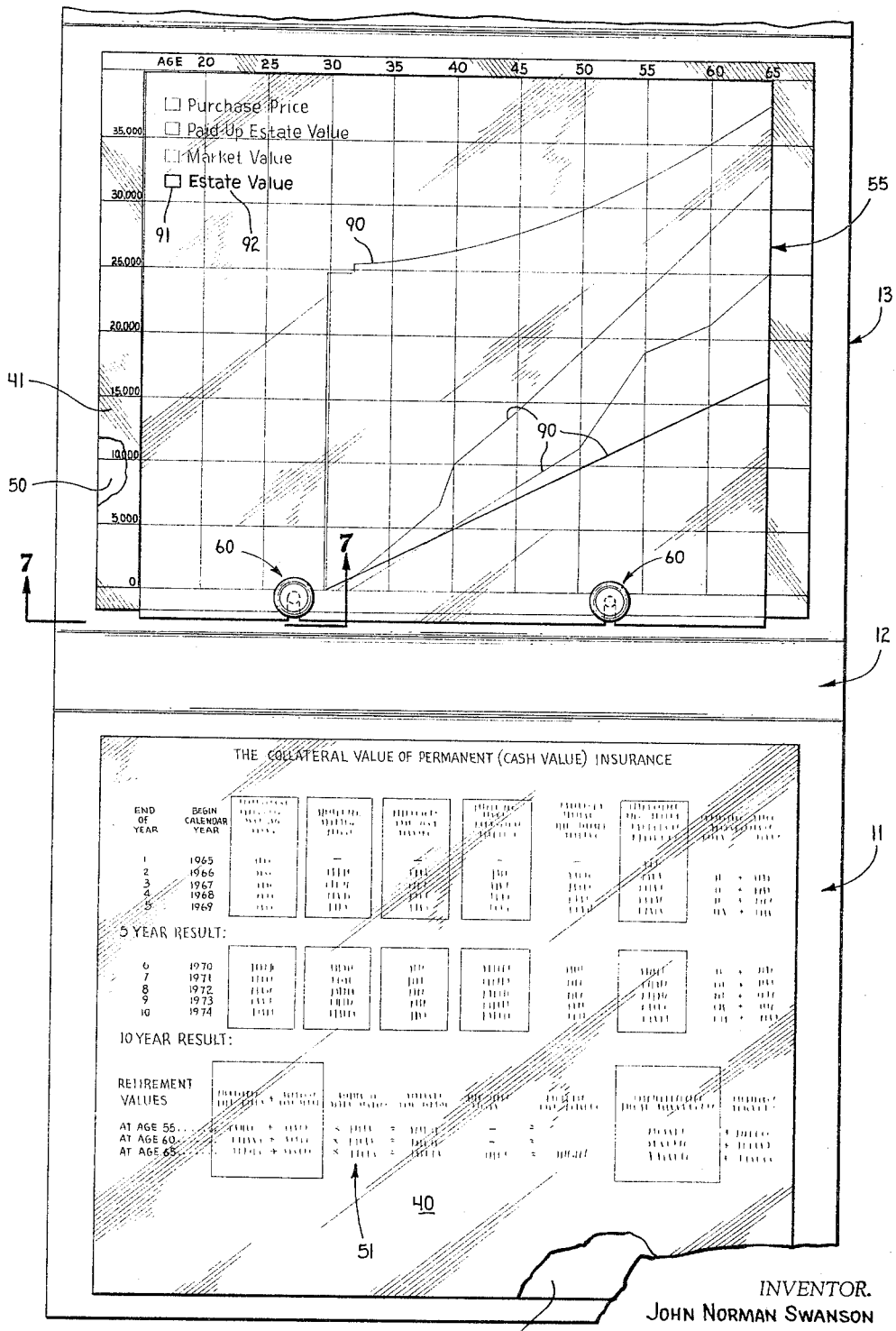
FIG. 6 is a fragmentary plan view of the device in open condition.
Figure 8:
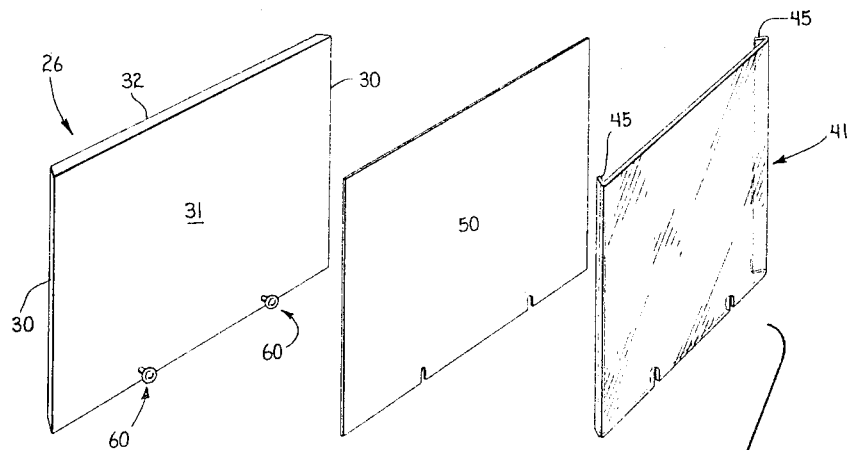
FIG. 8 is an exploded view showing the relationship of various overlays and associated structure forming a part of the present device.
Figure 7:
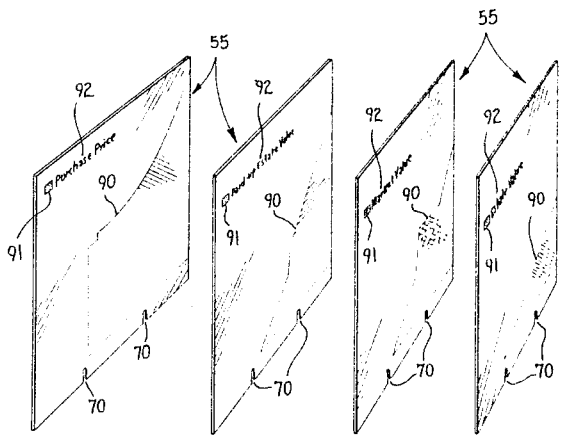
FIG. 7 is an enlarged section taken along the line 7—7 of FIG. 6.
Figure 7:
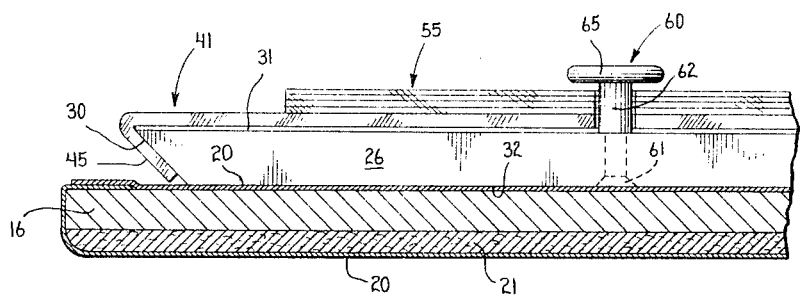

Referring more particularly to FIGS. 2, 7 and 8, each of the rectangular panels 11, 13 and 15 has a rectangular sheet 25, 26 and 27 of hardboard secured thereto and substantially covering the respective panel. Each sheet of hardboard 25–27 has a pair of opposite edges 30 which taper toward one another and toward their respective panels from the distal face 31 of the hardboard to the proximal face 32 thereof. On each of the rigid sheets of hardboard, there is slidably received a rigid transparent member 40, 41 and 42. Each of the transparent members 40–42 has flanges 45 at the opposite edges thereof which project inwardly and engage the opposite edges 30 of the respective hardboard sheets. The transparent members 40–42 are preferably formed of vinyl but can be formed of any strong, shock resistant, transparent plastic. Between the respective transparent members and their respective hardboard sheets, there is placed a sheet of printed or written material 50 of a relatively permanent nature. In other words, the material which is placed between the transparent sheets and their respective hardboards is intended for relatively permanent display. Refering, for example, to FIG. 6, the printed indicia 51 on the sheet 50 received beneath the transparent member 40 includes an explanation of collateral value of permanent insurance and as another example in the upper portion of FIG. 6, the hardboard 26 has a relatively permanent information sheet 50 thereon which has abscissa and ordinate showing age and thousands of dollars whereby various overlays 55 can be placed over the sheet 50 to indicate the changes of such variables as purchase price, paid-up estate value, market value and estate value with the age of the insured.

A pair of rivets 60 are secured to the hardboard sheet 26 and each include a head 61 which is received within a countersink in the back face 32 of the hardboard. The rivet 60 extends through the hardboard and has an enlarged cylindrical portion 62 engaging the front face 31 of the hardboard. The enlarged cylindrical portions 62 have integrally formed on their distal ends the enlarged heads 65.

The rivets 60 serve as mounting means for the overlays 55. It will be noted that each of the overlays 55 is provided with a pair of recesses 70 whereby the individual overlays can be placed on the transparent member 41 so as to overlie the abscissa and ordinate carrying basic graph 50. If desired, the overlays can be presented individually, in various orders or in various combinations at the same time. Also, the user of the display can go back to any particular overlay which he desires to emphasize without necessarily using the other overlays.

Figure 3:
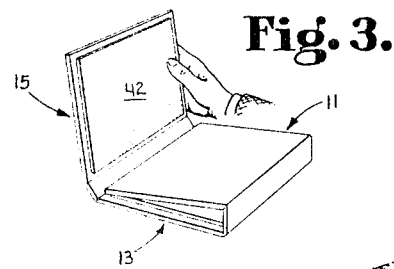
FIGS. 3, 4 and 5 are reduced size perspective views of the device of FIG. 1 but show the device in different operating positions.
Figure 5:
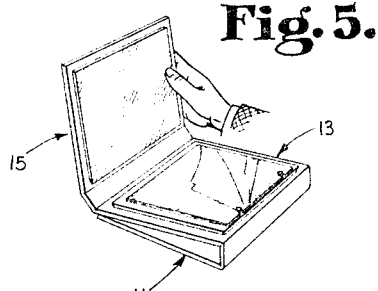
Figure 4:
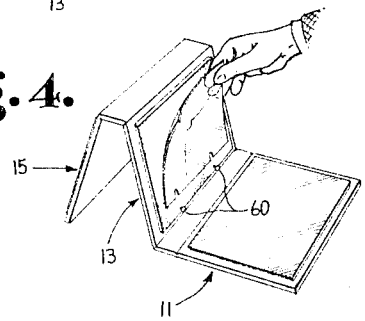

Referring to FIGS. 3–5, the display device can be presented in various operting positions. For example, in FIG. 3 the top panel 15 is raised so as to present the material 50 beneath the transparent member 42. It may be that the user of the display device desires to hide the various other information displayed by the device so as to concentrate attention on the material beneath the transparent member 42. Thus, FIG. 3 illustrates the ideal position for accomplishing this effect. FIG. 4 illustrates a position which can be used in order to present material supported on the panels 11 and 13 while FIG. 5 illustrates the most appropriate position for emphasizing and concentrating on the information displayed on the panels 15 and 13. It should be mentioned that the device will easily maintain the position illustrated in FIG. 4 by reason of the fact that friction-grip material 80 is placed on the edge 81 of the panel 15.

It can be seen that the various panels 11–15 each have the same height but have different widths. Thus, the panels 11, 13 and 15 have generally the same widths but are connected by the much narrower panels 12 and 14. The panel 12 has a width appropriate to permit folding of the panel 13 over and generally parallel with the panel 11 with the overlays 55, rivets 60 and two of the hardboards 25 and 26 therebetween. This position is shown in FIG. 2. The panel 14 has a width appropriate to permit folding of the panel 15 over and generally parallel with the panel 13 with all the hardboards and the first panel, the overlays and the rivets therebetween. The result of such folding is, of course, the attractive configuration illustrated in FIG. 1.

It will be evident from the above description that the present invention provides a display device which is an improved visual aid for the sale of a product or a service. It will also be evident that the present invention makes possible a colored graphic demonstration of an insurance policy and its various effects and ramifications without difficult and involved calculations and figuring. The various overlays 55 have graphs 90 thereon each of a different color while the overlays themselves are transparent but carry a color code 91 appropriate to the particular graph 90 on the overlay. Thus, no matter how many of the overlays are presented and no matter in what order they are presented, the viewer immediately ties in the particular color with the indicia 92 on the overlay of the same color.

It will also be evident from the above description that the present display device can be arranged in a number of attention-getting positions and configurations which aid the insurance agent or other speaker to concentrate attention upon an excellent visual aid. It will be further evident that the display device of the present invention can be easily folded up into an attaractive carrying position.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A display device comprising five stiffener plates all having an equal height, a cloth covering for said stiffener plates covering and foldably connecting said stiffener plates together width-edge-to-width-edge to provide a string of rectangular connected panels with a first thereof connected to a second thereof connected to a third thereof connected to a fourth thereof connected to a fifth thereof, each of the first, third and fifth panels having a rectangular sheet of hard board secured thereto and substantially covering the respective panel, each sheet of hard board having a pair of opposite edges which taper toward one another and toward their respective panels from the distal face of the hard board to the proximal face thereof, a plurality of rigid transparent members slidably received on and covering said sheets of hard board, said transparent members each having flanges at opposite edges thereof which project inwardly and engage said opposite edges of the respective hard board sheets, a pair of rivets secured to and extending through the third panel's sheet of hard board adjacent the second of said panels, each of said rivets having an enlarged cylindrical portion projecting away from said third panel's sheet of hard board and an enlarged head on the distal end of said cylindrical portion, said rigid transparent member for said third panel's hard board sheet having recesses which receive said rivets and permit said third panel's transparent member to be slidably removed from said third panel, transparent overlays selectively and alternatively and removably mounted on said rivets, said overlays each having a pair of recesses which receive the cylindrical portions of said rivets, said overlays each having a different colored graph thereon and each having a corresponding color code with identifying indicia thereon whereby each graph can be identified by its distinctively colored indicia, said third panel's transparent member having therebeneath an abscissa and ordinate carrying sheet for said overlays, said second panel having a width appropriate to permit folding said third panel over and generally parallel with said first panel with said overlays, rivets and two of said hard boards therebetween, said fourth panel having a width appropriate to permit folding said fifth panel over and generally parallel with said third panel with said hard boards and first panel and overlays and rivets therebetween; and friction grip material on the edge of said fifth panel which is away from said fourth panel.

2. A display device comprising five stiffener plates all having an equal height, a cloth covering for said stiffener plates covering and foldably connecting said stiffener plates together width-edge-to-width-edge to provide a string of rectangular connected panels with a first thereof connected to a second thereof connected to a third thereof connected to a fourth thereof connected to a fifth thereof, each of the first, third and fifth panels having a rectangular sheet of hard board secured thereto and substantially covering the respective panel, each sheet of hard board having a pair of opposite edges which taper toward one another and toward their respective panels from the distal face of the hard board to the proximal face thereof, a plurality of rigid transport members slidably received on and covering said sheets of hard board, said transparent members each having flanges at opposite edges thereof which project inwardly and engage said opposite edges of the respective hard board sheets, a pair of rivets secured to and extending through the third panel's sheet of hard board adjacent the second of said panels, each of said rivets having an enlarged cylindrical portion projecting away from said third panel's sheet of hard board and an enlarged head on the distal end of said cylindrical portion, said rigid transparent member for said third panel's hard board sheet having recesses which receive said rivets and permit said third panel's transparent member to be slidably removed from said third panel, transparent overlays selectively and alternatively and removably mounted on said rivets, said overlays each having a pair of recesses which the cylindrical portions of said rivets, said second panel having a width appropriate to permit said third panel over and generally parallel with said first panel with said overlays, rivets and two of said hard boards therebetween, said fourth panel having a width appropriate to permit folding said fifth panel over and generally parallel with said third panel with said hard boards and first panel and overlays and rivets therebetween; and friction grip material on the edge of said fifth panel which is away from said fourth panel for supporting said third and fifth panels in upwardly tapering relation toward one another.

3. A display device comprising a string of rectangular connected panels with a first thereof connected to a second thereof connected to a third thereof connected to a fourth thereof connected to a fifth thereof, each of the first, third and fifth panels having a rectangular sheet of hard board secured thereto and substantially covering the respective panel, each sheet of hard board having a pair of opposite edges which taper toward one another and toward their respective panels from the distal face of the hard board to the proximal face thereof, a plurality of rigid transparent members slidably received on and covering said sheets of hard board, said transparent members each having flanges at opposite edges thereof which project inwardly and engage said opposite edges of the respective hard board sheets, a pair of rivets secured to and extending through the third panel's sheet of hard board adjacent the second of said panels, each of said rivets having an enlarged cylindrical portion projecting away from said third panel's sheet of hard board and an enlarged head on the distal end of said cylindrical portion, said rigid transparent member for said third panel's hard board sheet having recesses which receive said rivets and permit said third panel's transparent member to be slidably removed from said third panel, transparent overlays selectively and alternatively and removably mounted on said rivets, said overlays each having a pair of recesses which receive the cylindrical portions of said rivets, said second panel having a width appropriate to permit folding said third panel over and generally parallel with said first panel with said overlays, rivets and two of said hard boards therebetween, said fourth panel having a width appropriate to permit folding said fifth panel over and generally parallel with said third panel with said hard boards and first panel and overlays and rivets therebetween, and friction grip material on the edge of said fifth panel which is away from said fourth panel for supporting said third and fifth panels in upwardly tapering relation toward one another.

4. A display device comprising a string of rectangular connected panels with a first thereof connected to a second thereof connected to a third thereof connected to a fourth thereof connected to a fifth thereof, each of the first, third and fifth panels having a rectangular sheet of hard board secured thereto and substantially covering the respective panel, each sheet of hard board having a pair of opposite edges which taper toward one another and toward their respective panels from the distal face of the hard board to the proximal face thereof, a plurality of rigid transparent members slidably received on and covering said sheets of hard board, a pair of rivets secured to and extending through the third panel's sheet of hard board adjacent the second of said panels and projecting away from said third panel's sheet of hard board, an enlarged head on the distal end of said rivet, said rigid transparent member for said third panel's hard board sheet having recesses which receive said rivets and permit said third panel's transparent member to be slidably removed from said third panels, transparent overlays selectively and alternatively and removably mounted on said rivets, said overlays each having a pair of recesses which receive said rivets, said second panel having a width appropriate to permit folding said third panel over and generally parallel with said first panel with said overlays, rivets and two of said hard boards therebetween, said fourth panel having a width appropriate to permit folding said fifth panel over and generally parallel with said third panel with said hard boards and first panel and overlays and rivets therebetween, and friction grip material on the edge of said fifth panel which is away from said fourth panel.

5. A display device comprising five stiffener plates all having an equal height, a cloth covering for said stiffener plates covering and foldably connecting said stiffener plates together width-edge-to-width-edge to provide a string of rectangular connected panels with a first thereof connected to a second thereof connected to a third thereof connected to a fourth thereof connected to a fifth thereof, each of the first, third and fifth panels having a rectangular sheet of hard board secured thereto and substantially covering the respective panel, each sheet of hard board having a pair of opposite edges which taper toward one another and toward their respective panels from the distal face of the hard board to the proximal face thereof, a plurality of rigid transparent members slidably received on and covering said sheets of hard board, said transparent members each having flanges at opposite edges thereof which project inwardly and engage said opposite edges of the respective hard board sheets, a pair of rivets secured to and extending through the third panel's sheet of hard board adjacent the second of said panels, each of said rivets having an enlarged cylindrical portion projecting away from said third panel's sheet of hard board and an enlarged head on the distal end of said cylindrical portion, said rigid transparent member for said third panel's hard board sheet having recesses which receive said rivets and permit said third panel's transparent member to be slidably removed from said third panel, and transparent overlays selectively and alternatively and removably mounted on said rivets, said overlays each having a pair of recesses which receive the cylindrical portions of said rivets.

References Cited by the Examiner
UNITED STATES PATENTS

| | | | |
|---|---|---|---|
| 2,224,539 | 12/1940 | Feeley | 40—102 X |
| 2,453,902 | 11/1948 | Graham | 40—152.1 |
| 2,603,018 | 7/1952 | Cross | 40—152.1 |
| 2,614,353 | 10/1952 | Goldman | 40—152.1 |
| 3,107,448 | 10/1963 | Whitney | 40—102 |

EUGENE R. CAPOZIO, *Primary Examiner.*